Jan. 22, 1963 T. R. QUERMANN 3,074,283
SINGLE DEGREE OF FREEDOM GYROSCOPE

Filed Nov. 30, 1959 3 Sheets-Sheet 1

Fig. 1

INVENTOR.
THOMAS R. QUERMANN
BY
ATTORNEY

Jan. 22, 1963  T. R. QUERMANN  3,074,283
SINGLE DEGREE OF FREEDOM GYROSCOPE
Filed Nov. 30, 1959  3 Sheets-Sheet 3

INVENTOR.
THOMAS R. QUERMANN
BY
ATTORNEY

United States Patent Office 3,074,283
Patented Jan. 22, 1963

3,074,283
SINGLE DEGREE OF FREEDOM GYROSCOPE
Thomas R. Quermann, Huntington Station, N.Y., assignor to United Aircraft Corporation, East Hartford, Conn., a corporation of Delaware
Filed Nov. 30, 1959, Ser. No. 856,203
21 Claims. (Cl. 74—5.7)

My invention relates to gyroscopes and more particularly to improved single degree of freedom gyroscopes.

Single degree of freedom gyroscopes may be either of the displacement or of the rate type. One problem which exists in all such gyroscopes is to obtain a high resolution output with good sensitivity and low threshold. Another problem which exists in rate gyroscopes is to obtain constant damping independent of temperature.

In single degree of freedom gyroscopes of the prior art both inductive and potentiometer pickoffs have been used. The inductive pickoff provides infinite resolution and a high sensitivity and a low threshold, but requires a large excitation current. Furthermore, if a direct-current output is required, then external phase-sensitive demodulators must be used. Potentiometers may be used to provide a direct-current output. But such potentiometers are very expensive and must be wound with many turns of extremely fine wire. Potentiometer pickoffs, even when wound with fine wire, have a much poorer resolution than do inductive pickoffs; and, because of brush friction, have a much higher threshold. Sensitivity of potentiometer pickoffs is poor and cannot be increased without limit because of power loss and possibility of burnout.

Some floated rate gyroscopes of the prior art have been damped by the provision of a high viscosity fluid subjected to shearing stress in a small gap between the float and the housing. However, even with silicone damping fluids, the viscosity may change by a factor of ten over a range of 120° C.

Other rate gyroscopes of the prior art use orifice damping. However, being dependent upon the fluid kinetic energy loss of sudden expansion, which varies as the square of velocity, such damping is more nearly square-law rather than linear as desired. Furthermore, the density of fluids is subject to appreciable change with temperature variation. Thus even square-law orifices result in an appreciable change in the root-mean-square damping over the temperature range required.

The prior art has proposed two methods of compensating for these damping variations with ambient temperature changes. One method is to employ a thermostat and heat the gyro to its highest temperature rating. Another method is to employ the expansion and contraction of the damping fluid with temperature, as measured by a bellows, to vary either the thickness of the damping gap or the area of the damping orifice. Heated gyros, however, have limited life since they are always operating at maximum temperature. Compensation for temperature by using the expansion and contraction of bellows to vary the disposition of damping components is an expensive expedient.

Displacement gyroscopes of the prior art have used auxiliary torquers which add considerably to the weight and size.

I have invented a single degree of freedom gyroscope providing an output proportional to gimbal deflection with infinite resolution, low threshold, high sensitivity, and negligible power loss adapted to generate single-phase alternating-current or polyphase alternating-current signals or direct-current signals without the need for external, synchronous phase-sensitive demodulators.

I have invented a rate gyroscope wherein damping is obtained by electromagnetic effects to produce truly linear damping with negligible temperature variation in damping factor.

I have invented a displacement gyroscope of reduced size and weight by eliminating torquer field structure.

One object of my invention is to provide a gyroscope wherein the spin motor itself is used to obtain an output signal proportional to gimbal deflection, thereby eliminating the need for an auxiliary pickoff.

Another object of my invention is to provide a gyroscope which provides single-phase alternating-current, polyphase alternating-current, or direct-current output signals, or any combination thereof.

A further object of my invention is to provide a rate gyroscope wherein linear damping and a constant damping factor is obtained by electromagnetic effects without dependence on fluid viscosity or fluid density.

Still a further object of my invention is to provide a torquable displacement gyroscope wherein the torquing winding reacts with the main field flux, thereby eliminating the need for auxiliary torquer field structure.

Other and further objects of my invention will appear from the following description.

In general my invention contemplates the provision of a pair of spin motor armatures mounted for common rotation on a shaft journaled in the gimbal. The pair of armatures is wound with a first winding which links the two armatures in a series-aiding fashion. The two armatures are wound with a second winding which links the armatures in a series-bucking fashion. Input excitation voltage is applied to the first winding. It is the second, series-bucking winding from which output voltages will be obtained. Two stationary poles are provided on the housing which are aligned with the sensitive or input axis. One of the poles comprises a pair of split subpoles axially displaced and parallel to one another so that each couples flux only to the outer portions of the two armatures. The other pole couples flux only to the inner portions of each of the two armatures. In the null position equal fluxes pass through the two armatures. If the gimbal rotates in one direction or the other the flux in one of the armatures will increase, while that in the other will decrease, the total flux remaining constant. Since the output winding is wound on the two armatures in a series-bucking fashion, equal and opposite voltages will be generated in the null position of the gimbal; and the net output voltage will be zero. When the gimbal is rotated in one direction or another the resulting flux unbalance between the two armatures will produce an output voltage. Mounted on the gimbal and interposed between the armatures and the stationary poles I provide an area of conductive material. The spin motor flux through each of the two armatures thus links these areas of conductive material. When the gimbal moves in one direction or the other, the flux of one armature must increase and that of the other must decrease. This requires a redistribution of the spin motor flux linking the areas of conductive material. This change in flux produces eddy currents in the areas of conductive material which react with the salient poles in a manner to oppose both the change in flux and the motion which causes such change in flux. By forming these conducting areas of material having a negligible temperature coefficient of resistivity, the damping is rendered independent of temperature. I provide a torquing winding mounted on the gimbal and disposed to generate oppositely directed fields which buck the main flux in one armature while aiding the main flux in the other armature. Output voltages are produced not only because of the resultant flux unbalance in the two armatures but also because the relative flux density unbalance produces a gimbal torque and a gimbal rotation which further magnifies the output voltage. This torquing winding may be short-circuited through a high negative temperature coefficient thermistor further to increase the damping in rate gyro applications. The gist of my invention resides in coupling flux from the stationary housing to the gimballed spin motor whereby the armature may rotate relative to the field about two orthogonal axes.

In the accompanying drawings which form part of the instant specification and which are to be read in conjunction therewith and in which like reference numerals are used to indicate like parts in the various views.

Figure 1:
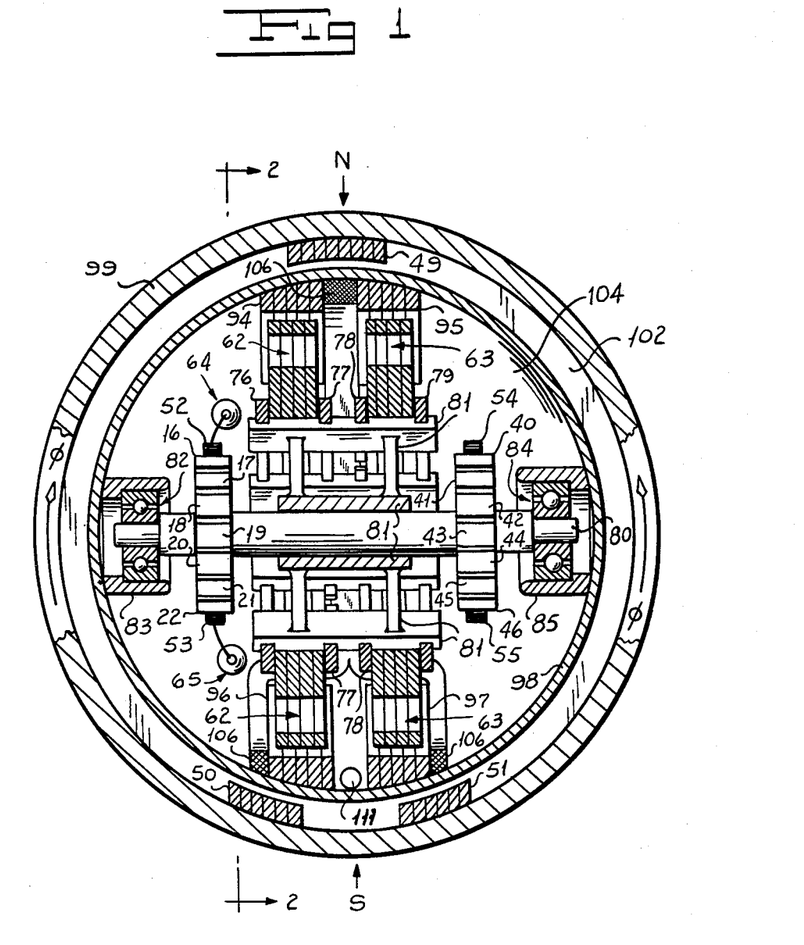
FIGURE 1 is an end sectional view taken generally along the plane 1—1 in FIGURE 2.
Figure 2:
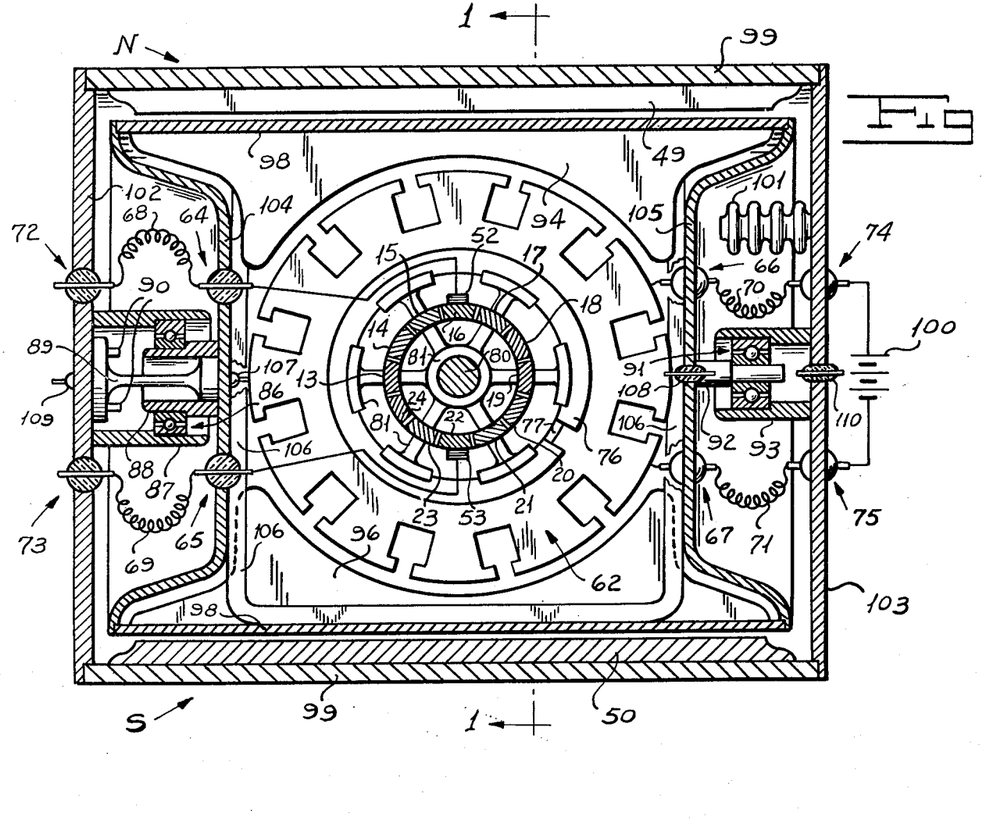
FIGURE 2 is a side sectional view taken generally along the plane 2—2 in FIGURE 1.

More particularly referring now to FIGURES 1 and 2. One of the armatures is indicated generally by the reference character 62; and the other of the armatures is indicated generally by the reference character 63. Each of armatures 62 and 63 comprises a stack of laminations. The laminations of armature 62 are mounted on a spider 81 and secured by snap-spring end-rings 76 and 77. The stack of laminations comprising armature 63 are likewise mounted on the spider 81 and secured by snap-spring end-rings 78 and 79. Armatures 62 and 63 are each provided with twelve teeth and twelve semi-closed slots. The spider 81 comprises a hub and six pairs of legs, each pair of which supports a foot upon which are mounted armatures 62 and 63 and into which are machined recesses to receive snap-spring end-rings 76 through 79. The hub of spider 81 is secured to the rotor shaft 80. Mounted on rotor shaft 80 adjacent armature 62 is an output commutator comprising twelve bars 13 through 24. An input commutator comprising twelve bars 37 through 48 is mounted on shaft 80 adjacent armature 63. The ends of rotor shaft 80 are supported by the inner races of ball bearings indicated generally by the reference characters 82 and 84. I provide a floated gimbal structure comprising a cylinder 98 and a pair of bowl-shaped end members 104 and 105 which are hermetically sealed to cylinder 98. The outer races of ball bearings 82 and 84 are supported by members 83 and 85 which are diametrically secured to the inside of cylinder 98. The gimbal or output axis is determined by a stub shaft 92 and a member 88 which are axially secured to the outsides of bowl-shaped end members 105 and 104, respectively. Diametrically secured to the inside of cylinder 98 are a pair of laminated pole shoes 94 and 96 associated with armature 62 and a pair of laminated pole shoes 95 and 97 associated with armature 63. The pole shoes 94 and 96 and also 95 and 97 are aligned with the input axis which is at right angles both to the spin reference axis as determined by shaft 80 and the gimbal or output axis as determined by stub shaft 92. Pole shoes 94 and 95 are disposed parallel to one another and couple flux to armatures 62 and 63, respectively. Pole shoes 96 and 97 are disposed parallel to one another and couple flux from armatures 62 and 63, respectively. Stub shaft 92 is supported by the inner race of a ball bearing indicated generally by the reference character 91. The outer race of bearing 91 is supported by a member 93 which is axially secured to a circular end-plate 103. Output axis member 88 is of hollow cylindrical shape and is supported by the inner race of a ball bearing indicated generally by the reference character 86. The outer race of bearing 86 is supported by a member 87 which is axially secured to a circular end plate 102. I provide a torsion bar 89, having the shape of a collar button. Torsion bar 89 etends axially through the hollow cylindrical output axis member 88. One end of torsion bar collar button 89 is axially secured to the outside of the bowl-shaped end member 104. The other end of torsion bar collar button 89 is axially secured to end plate 102 by a pair of pins 90 which provide constraint against rotation. Circular end plates 102 and 103 are hermetically sealed to a cylindrical housing 99. Housing 99 is formed of a permanent magnetic material having diametrically opposed and longitudinally extending north and south pole lines indicated generally by the reference letters N and S, respectively. A longitudinally extending laminated pole shoe 49 is secured to the inside of the cylindrical housing 99 and symmetrically extends circumferentially about the north pole line N. In the null position pole shoe 49 couples equal amounts of flux only to the inner portions of pole faces 94 and 95. A pair of parallel and longitudinally extending laminated pole shoes 50 and 51 are secured to the inside of the cylindrical housing 99 and are symmetrically disposed circumferentially about the south pole line S. In the null position, as shown, pole shoe 50 receives flux only from the outer portion of pole face 96; and pole shoe 51 receives flux only from the outer portion of pole face 97. North pole shoe 49 and the pair of south pole shoes 50 and 51 are thus diametrically disposed along the sensitive or input axis. I provide a pair of output brushes 52 and 53. In the position shown, brush 52 contacts commutator bar 16; and output brush 53 contacts commutator bar 22. I provide a pair of input brushes 54 and 55. In the position shown, brush 54 contacts commutator bar 40; and input brush 55 contacts commutator bar 46. Since my machine is drum wound, pairs of brushes 52 and 53 and also 54 and 55 are disposed at the midpoints of the poles. Brushes 52 through 55 are supported and resiliently maintained in contact with the input and output commutators by suitable brush rigging (not shown) secured to the inside of float gimbal cylinder 98. I provide eight hermetically sealed and insulated terminals indicated generally by the reference characters 64, 65, 66, 67, 72, 73, 74, and 75. Terminals 64 and 65 extend through gimbal bowl 104; terminals 66 and 67 extend through gimbal bowl 105; terminals 72 and 73 extend through end-plate 102; and terminals 74 and 75 extend through end-plate 103. Output brush 52 is connected to the terminal 64; and output brush 53 is connected to terminal 65. Input brush 54 is connected to terminal 66; and input brush 55 is connected to terminal 67. Terminal 64 is connected by a flexible lead 68 to terminal 72; terminal 65 is connected by a flexible lead 69 to terminal 73; terminal 66 is connected by a flexible lead 70 to terminal 74; and terminal 67 is connected by a flexible lead 71 to terminal 75. A signal proportional to gimbal deflection appears between terminals 72 and 73. The positive plate of an input excitation battery 100 is connected to terminal 74; and the negative plate of battery 100 is connected to terminal 75. A bellows 101 filled with pressurized gas is secured to end plate 103. The inner surface of pole shoes 49 through 51 and the outer surfaces of pole faces 94 through 97 are cylindrical to accommodate angular movements of the floated gimbal about the gimbal output axis without altering the gap which the field flux must cross. A torquing winding 106 of rectangular shape from the side view of FIGURE 2 is mounted inside the floated gimbal. All of the turns of winding 106 thread between pole faces 94 and 95; and half of the turns are returned on the outside of each of pole faces 96 and 97. From a top view, winding 106 resembles a figure eight and produces oppositely directed fluxes in armatures 62 and 63 along the input axis. I provide four hermetically sealed and insulated terminals 107, 108, 109, and 110. Terminals 107 and 108 extend through gimbal bowls 104 and 105, respectively; and terminals 109 and 110 extend through end-plates 102 and 103, respectively. Torquing winding 106 may be connected by conductors (not shown) to terminals 107 and 108. Terminals 107 and 108 may be connected by flexible leads (not shown) to terminals 109 and 110, respectively. Direct-current signals applied to terminals 109 and 110 may thus exert torques about the gimbal axis in displacement gyro applications. I mount a negative temperature coefficient resistor 111, such as a thermistor, between pole faces 96 and 97. Winding 106 may be short-circuited through thermistor 111 to increase the damping in rate gyro applications where it is not desired to apply torquing signals. As can be seen by reference to FIGURE 1, the field flux $\phi$ flows from the longitudinally extending south pole area S through the two halves of the cylindrical housing 99 to the longitudinally extending north pole area N along the entire axis of cylindrical housing 99. The permanent magnet material of which housing 99 is formed should preferably have a high residual flux density, a high coercive force, and a high second quadrant external energy product. Pole shoes 49 through 51, armatures 62 and 63, and pole faces 94 through 97 are preferably composed of thin laminations formed of a material having a high permeability, a high saturation induction, a high resistivity, and a low hysteresis loss. Float cylinder 98 and float end bowls 104 and 105 and housing end disks 102 and 103 should be formed of non-magnetic materials having very low permeabilities and very low saturation inductions in order to eliminate any shunting effect, so that all of the field flux passes through armatures 62 and 63. Floated gimbal cylinder 98, at least in the regions adjacent pole faces 94 through 97, should be formed of a non-magnetic material having a low resistivity and a zero or preferably slightly negative temperature coefficient of resistance. The interior of the hermetically sealed floated gimbal may be filled with a subatmospheric mixture of low density gases in order to reduce spin motor windage losses. The hermetically sealed space between the housing and the floated gimbal is filled with a fluid having a low viscosity, a level viscosity index whereby the decrease in viscosity with increase in temperature is small, a low temperature coefficient of expansion, and a low temperature coefficient of density. This fluid which supports the floated gimbal should also be noncorrosive and preferably have some lubricating properties to reduce the static friction of gimbal bearings 86 and 91. At the mean value of temperature over the range of temperatures that my gyroscope is required to operate, the buoying fluid will have a certain density and a certain volume. The weight of the floated gimbal may be adjusted by suitable counterweights so that at this fluid density no supporting forces will be exerted at bearings 86 and 91. At this particular value of fluid volume, the bellows 101 should preferably be midway between its maximum expansion or contraction. The amount of field flux through pole shoe 49 is equal to the sum of the fluxes through pole shoes 50 and 51. The dimensions of pole shoe 49 and the amount of overlap of pole shoe 50 with pole face 96 and of pole shoe 51 with pole face 97 are such that the projected area of the gaps which flux must cross are precisely equal for both the north and south pole regions. The fringing effect of flux is also substantially equal for the north and south pole regions. Accordingly the gap flux densities for the north and south pole regions are substantially equal. Thus there is substantially no magnetic unbalance; and no forces due to magnetic unbalance will be exerted on gimbal bearings 86 and 91. The floated gimbal should be balanced so that no residual gimbal torques occur due to acceleration. Also, because the total projected gap area remains constant despite gimbal rotation, no magnetic torques are exerted on the gimbal.

Figure 3:
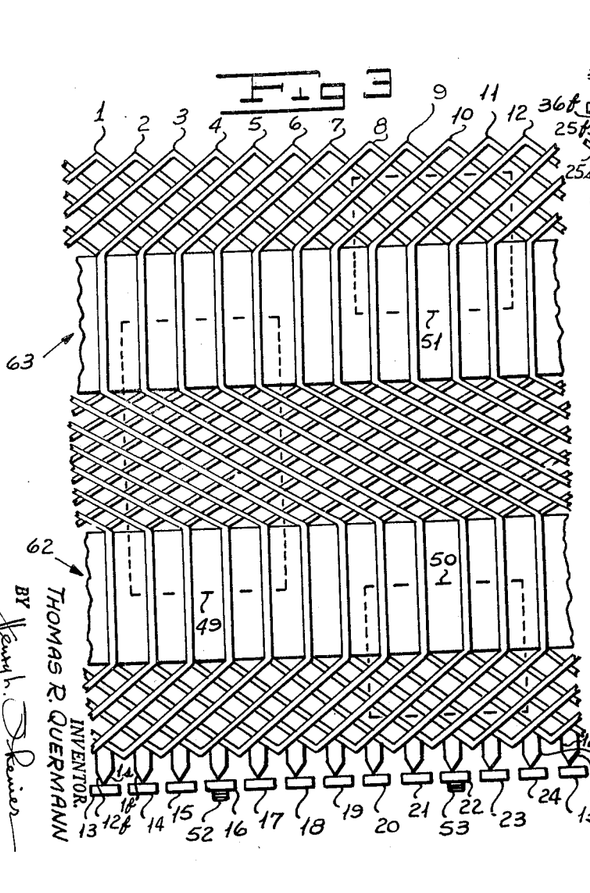
FIGURE 3 is a developed schematic view of the series-bucking armature output winding.

Referring now to FIGURE 3, the output winding comprises twelve coils 1 through 12 which are each formed in the shape of a figure eight. Each of coils 1 through 12 is of full-pitch. Since there are twelve slots and two poles, each of coils 1 through 12 spans six slots. The output winding is a double-layer, lap winding having two coil sides per slot. The start 12s of coil 12 is connected to commutator bar 24. The finish 12f of coil 12 is connected to the adjacent commutator bar 13. The start 1s of the adjacent coil 1 is also connected to commutator bar 13. The finish 1f of the adjacent coil 1 is connected to the adjacent commutator bar 14. Thus the output winding is progressive and singly re-entrant. It will be appreciated that for each output coil, because of the figure-eight construction, the voltages in the coil sides in slots of armature 62 will series buck the voltages induced in the coil sides in the slots of armature 63. Let us trace coil 6. The start of coil 6 is connected to commutator bar 18. Coil 6 proceeds upwardly and to the left under coils 5 through 1 to armature 62, thence upwardly through a slot of armature 62 under coil 12, thence upwardly and to the right in the space between armatures 62 and 63 under coils 1 through 11 to armature 63, and thence upwardly through a slot of armature 63 under coil 12. The end connection for coil 6 proceeds upwardly and to the left under coils 11 through 7 and then downwardly and to the left over coils 5 through 1 to armature 63 again. Coil 6 then proceeds downwardly through a slot of armature 63 over coil 12, thence downwardly and to the right in the space between armatures 62 and 63 over coils 1 through 11 to armature 62, thence downwardly through a slot of armature 62 over coil 12, and thence downwardly and to the left over coils 11 through 7 to the finish of coil 6, which is connected to commutator bar 19.

Figure 4:
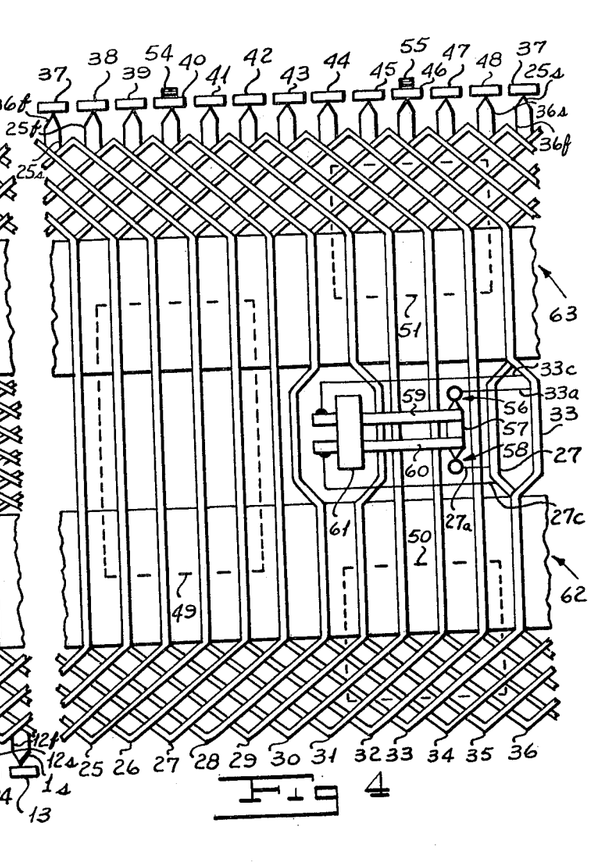
FIGURE 4 is a developed schematic view of the series-aiding armature input excitation winding.

Referring now to FIGURE 4, the input winding comprises twelve coils 25 through 36 which are wound on armatures 62 and 63 and connected as a full-pitch, progressive, double-layer, singly re-entrant lap winding having two coil sides per slot. The start 36s of coil 36 is connected to commutator bar 48. The finish 36f of coil 36 is connected to the adjacent commutator bar 37. The start 25s of the adjacent coil 25 is also connected to commutator bar 37. The finish 25f of coil 25 is connected to the adjacent commutator bar 38. Let us trace coil 31. The start of coil 31 is connected to commutator bar 43. Coil 31 proceeds downwardly and to the left under coils 30 through 26 to armature 63, thence downwardly through corresponding slots of armatures 63 and 62 under coil 25. The end connection for coil 31 proceeds downwardly and to the right under coils 26 through 30 and then upwardly and to the right over coils 32 through 36 to armature 62 again. Coil 31 then proceeds upwardly through corresponding slots of armatures 62 and 63 over coil 25, and thence over coils 36 through 32 to the finish of coil 31 which is connected to commutator bar 44. Thus the input winding is wound on armatures 62 and 63 in the same manner as on conventional machines having air duct spacing between axially spaced stacks of laminations.

The speed of rotation of the spin motor is ordinarily proportional to the voltage of input excitation battery 100 and inversely proporional to the field flux $\phi$. In order precisely to determine the speed and hence the angular momentum of the spin motor independently of variations in the voltage of excitation battery 100, I provide a centrifugal switch having a body member 61 which is secured to one of the six feet of spider 81. Centrifugal switch body member 61 supports leaf spring members 59 and 60 which are formed of an electrically conductive material. The ends of leaf springs 59 and 60 remote body member 61 are secured to one another by an insulating spacer 57. Leaf spring 59 controls a contact indicated generally by the reference character 56 and leaf spring 60 controls a contact indicated generally by the reference character 58. Contacts 56 and 58 are likewise placed at the ends of leaf springs 59 and 60 remote body member 61. One of the conductors of coil 33 is cut, one end 33c being connected to conductive leaf spring 59 adjacent body member 61 and the other end 33a being connected to switch contact 56.

One of the conductors of coil 27 is cut, one end 27c being connected to conductive leaf spring 60 adjacent body member 61 and the other end 27a being connected to switch contact 58. It will be noted that both of coils 27 and 33 may be open-circuited when the speed of the spin motor, and hence the centrifugal force, is such that leaf springs 59 and 60 cause switches 56 and 58 to open. It will be noted that coils 27 and 33 are displaced by 180° both mechanically and electrically since the spin motor is a two-pole machine. In a two-pole simplex lap wound machine, and in all simplex wave wound machines, there are only two parallel paths through the armature. Switches 56 and 58 are adapted simultaneously to interrupt both of these parallel paths. It will be seen that if, in FIGURE 4, the armature moves slightly to the right relative to input brushes 54 and 55 so that brush 54 bridges commutator bars 39 and 40 and input brush 55 bridges commutator bars 45 and 46, then both of coils 27 and 33 will be short-circuited. During this interval, armature current may flow even though switches 56 and 58 be open. However, because of the reactance associated with the semi-closed slots and with the end connections, very little armature current will flow during this brief time interval. These small pulses of armature current occur twice a revolution but produce insufficient average current to maintain the armature at rated speed. When the armature drops below rated speed, switches 56 and 58 will close, causing normal armature current to flow. By simultaneously open-circuiting, for the major portion of time, the two parallel armature paths, the necessity for providing a pair of slip rings on the spin motor shaft is eliminated. Ordinarily, only one centrifugal switch is mounted on the armature and is connected to such a pair of slip rings. A brush associated with one slip ring is connected to one terminal of the source of input excitation voltage; and a brush associated with the other of he slip rings is connected to one of the input commutator brushes.

In operation of my single degree of freedom gyroscope as a rate gyro, input exitation voltage from battery 100 is coupled through flexible leads 70 and 71 to input brushes 54 and 55. Currents flowing through the input winding, which links armatures 62 and 63 in series-aiding fashion, react with the main field flux $\phi$ causing the spin motor to accelerate until it reaches rated speed. At such speed centrifugal switches 56 and 58 simultaneously open, substantially eliminating the flow of armature current. The spin motor then regulates at its rated speed. In the absence of an angular velocity about the sensitive or input axis, torsion bar 89 centers the gimbal, causing equal fluxes to flow through armatures 62 and 63. The output winding, being wound on armatures 62 and 63 in series-bucking fashion, produces zero output voltage. Winding 106 may be eliminated, or may be left open-circuited, or may be short-circuited through the negative temperature coefficient resistor 111. If my gyroscope is rotated with a certain angular velocity about the input axis, a precessional torque will be exerted about the gimbal or output axis. The gimbal will rotate until the restoring torque exerted by torsion bar 89 is equal and opposite to the precessional torque. As will be appreciated by those skilled in the art, the amount of gimbal rotation is proportional to the angular velocity about the input axis. Assume that the gimbal rotates clockwise in FIGURE 1. The projected area of the gaps between pole shoe 48 and pole face 94 and also between pole shoe 50 and pole face 96 will increase, while the projected area of the gaps between pole shoe 49 and pole face 95 and also pole shoe 51 and pole face 97 will decrease. Thus the direct axis reluctance of armature 62 decreases while that of armature 63 increases. More field flux will flow through armature 62 than through armature 63, the sum of the fluxes through armatures 62 and 63 remaining constant. The redistribution of the field fluxes in the armatures produces a net alternating-current voltage in the output winding. Output brushes 52 and 53 synchronously rectify this output voltage, which is then conducted by flexible leads 68 and 69 to output terminals 72 and 73, respectively. The alternating-current voltage induced in the output winding changes polarity as the gimbal moves clockwise or counterclockwise relative to the null position; and its amplitude is proportional within wide limits to the amount of gimbal displacement. The synchronous rectification by means of the output commutator and output brushes 52 and 53 produces a direct-current voltage at terminals 72 and 73 of a polarity corresponding to the direction of gimbal tilt and of a magnitude proportional to the amount of tilt. The redistribution of the field fluxes through armatures 62 and 63 occasioned by a movement of the gimbal also produces a redistribution of the fluxes linking the conductive areas of the floated gimbal cylinder 98 in the regions adjacent pole faces 94 through 97. These areas of conductive material act as single short-circuited turns. The change in flux through the conductive areas of gimbal cylinder 98 produces currents which flow in such manner as not only to reduce the change in flux distribution but also to oppose the motion causing such as change. Furthermore, the redistribution of fluxes in armatures 62 and 63 induces voltages in winding 106. If winding 106 is short-circuited through thermistor 111, currents will flow in this winding in a direction to oppose not only the change in flux distribution but also the motion which produces it. The damping afforded by the conductive areas of floated gimbal cylinder 98 and by winding 106 is linear, since it depends upon the rate of change of flux linkages, which in turn is proportional to the speed of gimbal rotation. The damping factor may be adjusted either by varying the thickness of the conductive areas of gimbal cylinder 98 in the region adjacent pole faces 94 through 97 or by varying the resistance of thermistor 111.

In operation of my single degree of freedom gyroscope as a displacement gyro, one end of winding 106 is connected to terminal 107 and the other end of winding 106 is connected either directly or in series with thermistor 111 to terminal 108. Torsion bar 89 may be eliminated; or pins 90 may be removed so that no restoring torques are exerted on the gimbal. Terminals 109 and 110 are connected to a source of torquing voltage or current. The output voltage at terminals 72 and 73, as is well known in the art, is impressed on a servomotor (not shown) which rotates the gyroscope about its input axis until the gimbal is at a null position, where the output voltage at terminals 72 and 73 returns to zero. If a torquing signal is applied, the current flowing in winding 106 produces magnetomotive forces which, for example, may oppose the main field flux in armature 62 while aiding the main field flux in armature 63. This produces a flux density unbalance between armatures 62 and 63 with that of armature 63 preponderant. This immediately produces an output voltage at terminals 72 and 73. The resulting flux density unbalance produces a torque which would tend to rotate the gimbal counterclockwise in FIGURE 1 and further increase the output voltage at terminals 72 and 73. However, the feedback output voltage at terminals 72 and 73 causes such servomotor to rotate the gyro about its input axis in such direction and at such rate that the resultant gimbal precessional torque rotates the gimbal clockwise against the torque of magnetic flux density unbalance. The system reaches a null when the flux in armature 62 has increased and the flux in armature 63 has decreased sufficiently that the two armature fluxes are equal and the output voltage at terminals 72 and 73 returns to zero. My integrating, displacement gyroscope will thus be forced, by such servomotor, to rotate about the input axis at an angular velocity proportional to the current in torquing winding 106, as will be readily appreciated by those skilled in the art.

As has been previously explained, my gyroscope is adapted to operate on polyphase input excitation voltage and to provide either single-phase or polyphase output voltages. If it is desired that a three-phase alternating-current input rather than a direct-current input be used, then I may provide, in place of the input commutator, three slip rings each having an associated stationary brush. The slip rings would be connected to the input winding at points displaced 120° in phase. Thus one slip ring could be connected to the junction of the finish 25f of coil 25 and the start of coil 26. In FIGURE 4 commutator bar 38 is connected to this junction. Another slip ring may be connected to the junction of the finish of coil 29 and the start of coil 30. In FIGURE 4 commutator bar 42 is connected to this junction. There are twelve coils in the input winding. Commutator bars 42 and 38 have four coils between them, and are thus spaced apart 120°. The third slip ring would be connected to the junction of the finish of coil 33 and the start of coil 34. In FIGURE 4 commutator bar 46 is connected to this junction. There are four coils between bars 42 and 46 and also four coils between bars 46 and 38. Thus commutator bar 46 is displaced in phase 120° from each of bars 42 and 38. When three-phase alternating-current is applied to the input winding, no input commutator is required. To the three brushes which ride on the three slip rings I would apply a source of balanced three-phase alternating current. Since for alternating-current applications the speed of rotation of the spin motor is governed by the frequency of the three-phase source, the centrifugal switch may be eliminated. Leads 33a and 33c need not be brought out from coil 33; and leads 27a and 27c need not be brought out from coil 27. The magnitude of the input voltage should be adjusted so that the motor operates with unity power factor; and the armature reaction neither aids nor opposes the main field flux. It will be appreciated that the sensitivity will vary with the input voltage, since the motor will operate with a leading or lagging power factor and increase or decrease the main field flux from its normal value. If a single-phase alternating-current output is desired concomitantly with a direct-current output, then, in addition to the output commutator, I may provide a pair of slip rings each having an associated stationary brush. The slip rings would be connected to the output winding at points displaced in phase by 180°. For example, one slip ring may be connected to the junction of the finish of coil 2 and the start of coil 3. Commutator bar 15 is connected to this junction. The other slip ring may be connected to the junction of the finish of coil 8 and the start of coil 9. Commutator bar 21 is connected to this junction. There are twelve coils in the output winding. Since there are six coils between commutator bars 16 and 21, the two slip rings will be tapped into the output winding at points displaced 180° in phase. If a three-phase alternating-current output is desired concomitantly with a direct-current output, then I may provide three output slip rings each having an associated brush. The three slip rings would be tapped into the output winding at points displaced in phase by 120°. For example, the three slip rings may be connected to the junction of coils corresponding to commutator bars 15, 19, and 23. These bars are each separated by four coils and thus are displaced in phase by 120°. The phase shift between alternating currents applied to the input winding and alternating currents provided by the output winding may be varied by selecting different groups of winding junctions having the same relative phase displacements. For example, rather than applying three-phase input voltages to the junctions corresponding to the commutator bars 38, 42, and 46, I may instead connect the three-phase input voltages to the junctions corresponding to commutator bars 39, 43, and 47. This would vary the phase shift between input and output voltages by 30°. It will also be appreciated that I may provide single phase and polyphase outputs concomitantly with a direct-current output merely by providing appropriate slip rings tapped into the output winding at suitably placed points. Those skilled in the synchronous converter art will readily appreciate that many connections are possible for such double-current generators. For a direct-current input and a direct-current output, as shown, my gyroscope functions as a dynamotor, since electrical power taken from the output winding is provided directly from battery 100 without the necessity of converting the energy from the battery into mechanical energy and then reconverting the mechanical energy into electrical output energy. This is the same principle upon which synchronous converters operate. Thus for applications of my gyroscope where alternating current is required either for input or for output windings, the output power is obtained directly from the source of input excitation voltage. My pickoff, therefore, has a high efficiency. The only power absorbed from the source of input excitation voltage is the output power plus that consumed in windage, friction, and core loss of the spin motor.

It will be noted that where three-phase voltages are applied to the input winding, the areas of conductive material of float cylinder 98 interposed between pole faces 94 through 97 and the pole shoes 49 through 51 act as a squirrel cage enabling the synchronous motor to have the starting torque characteristics of an induction motor. Further these areas of conductive material act as amortisseur, pole-face windings for the synchronous motor once it has pulled into step and damp oscillations which might otherwise cause the spin motor to drop out of step and slip a number of poles. The salient pole faces 94 through 97 provide good synchronizing pull-in torque characteristics because of the low direct axis reluctance and the high quadrature axis reluctance.

Because torquing winding produces no resultant magnetomotive force along the axis of field flux, winding 106, even if short-circuited through the thermistor 111, can product no induction motor starting torque and no amortisseur synchronous motor damping torques for polyphase alternating-current inputs. A symmetrical increase or decrease in the main field flux through armatures 62 and 63 will produce equal and opposite voltages in the two portions of the figure-eight coils of winding 106. The short-circuiting of winding 106 causes damping torques to be exerted only for rotation about the gimbal axis. The areas of conductive material of float cylinder 98 provide damping torques both for movements about the gimbal or output axis and for movements about the spin reference axis.

It may be desirable for direct-current input excitation voltage, as shown, to shift input brushes 54 and 55 slightly in order to improve commutation. As will be appreciated by those skilled in the art, a slight brush shift causes a commutating voltage to be generated which bucks the reactance voltage associated with rapidly reversing the current in a winding. Since, neglecting output power consumed at terminals 72 and 73, the friction and windage and core loss of the spin motor, and hence spin motor power, will be substantially constant, the current drawn by the spin motor will likewise be substantially constant; and a fixed value of brush shift will suffice to eliminate sparking at the input commutator.

It will be noted that in rate gyroscope applications the damping effect both of the areas of conductive material of float cylinder 98 and of the short-circuited winding 106 upon the voltage appearing at terminals 72 and 73 exceeds the mechanical damping upon the gimbal. Currents generated either in these conductive areas or in winding 106, in addition to imposing a mechanical torque, also prevent redistribution of fluxes. For example, if I force the gimbal to move rapidly back and forth by exerting considerable alternating torques upon it, the output at terminals 72 and 73 will not appreciably change, since the flux in armatures 62 and 63 will tend to remain constant because of the damping currents. Here the mechanical damping forces may be readily felt with rotation of the gimbal; but the gimbal rotation does not immediately produce a corresponding voltage at the output terminals. Accordingly, the transfer function for my rate gyro is determined by the ratio of output voltage to rate of rotation about the input axis. In rate gyros of the prior art, output voltage and gimbal rotation bear a one-to-one correspondence. In rate gyros of the prior art, the transfer function is determined by the ratio either of output voltage or of gimbal rotation to angular velocity about the input axis. Thus in my rate gyro, the gimbal may be less than critically damped and overshoot its steady state position, yet the output voltage may be critically damped and not overshoot its steady state value.

My single degree of freedom gyroscope is preferably a two-pole machine because of the nature of gimbal tilt about the output axis. My spin motor rotates relative to the main field flux not only about the spin motor axis but also about the gimbal output axis. While it would be possible to provide a four-pole machine, the magnetic flux paths for two of the poles would be of an indirect and serpentine nature which would require additional weight and space for iron in such circuitous magnetic paths, in addition to increasing the leakage flux of the machine.

The provision of pole faces 94 through 97 is advantageous for many reasons. Suppose for the moment that pole faces 94 through 97 were eliminated. This would require that the float be of a spherical shape. The outer surfaces of armatures 62 and 63 would also have to be spherical. Pole shoes 49 through 51 would be extended to conform to the spherical shape of the float, which in turn would conform to the spherical shape of the outer surfaces of armatures 62 and 63. If the float were formed of a conductive material, then flux tufting adjacent the teeth would introduce serious eddy current losses with rotation of the spin motor. This would necessitate the provision of closed slots to reduce such eddy current losses. Such closed slots would introduce high armature reactances with resultant deterioration in commutation, causing sparking at the input brushes and reduced life. Furthermore, the entire torque required to rotate the spin motor would be transmitted through the gimbal bearings resulting in high friction about the output axis and a high threshold. Finally the sensitivity would be reduced because of the reduced circumferential motion of the armatures relative to the extended poles 49 through 51 near the pole tips. This would require that the pole arc be appreciably less than full pitch because of the reduced effectiveness of the pole tips if they extend close to the gimbal axis.

By providing pole faces 94 through 97 I may eliminate each of the foregoing disadvantages. The high permeability of these pole faces greatly attenuates the flux tufting adjacent the teeth so that substantially no flux pulsations are propagated through the pole faces to the conductive areas of float cylinder 98. By forming the pole faces of thin laminations, eddy current losses are reduced to reasonable values. Thus I may provide open slots, reducing the armature reactance, improving commutation, eliminating sparking at the brushes, and increasing the life of the machine. The entire torque required to rotate the spin motor is transmitted directly through the gimbal structure and is completely isolated from the gimbal bearings. This eliminates friction in the gimbal bearings due to spin motor torque and results in a low threshold. Finally pole faces 94 through 97 afford an excellent transition for flux flowing from pole shoes 49 through 51 to armatures 62 and 63. The outer surfaces of pole faces 94 through 97 are concentric with the gimbal axis. Since all portions of the outer surfaces of the pole faces 94 through 97 are at the same radial distance from the gimbal axis, they have a uniform circumferential motion relative to the pole shoes 49 through 51. Rotation of the gimbal does not alter the position of the pole faces relative to the pair of armatures. The pole arc may thus approach full pitch resulting in lower air gap flux densities and lower leakage fluxes as in conventional machines.

The bowl-shaped gimbal members 104 and 105 enable the pole faces 94 through 97 to be axially extended over substantially the entire length of the magnetic housing 99. This increases the area of the gap and reduces the gap flux density. Since less external energy is required from the permanent magnet cylindrical housing 99, the total weight and volume of permanent magnet material may be accordingly reduced for the same total field flux.

My single degree of freedom gyroscope need not be mounted remote from other low reluctance objects; but my gyro should be mounted so that there is no low reluctance path between the north and south pole areas which would otherwise tend to shunt the main field flux from armatures 62 and 63.

As can be seen by reference to FIGURE 1 if the gimbal is rotated clockwise 8° from the position shown, then the left hand edge of pole face 94 will coincide with the left hand edge of pole shoe 49; and the right hand edge of pole face 96 will coincide with the right hand edge of pole shoe 50. Also the left hand edge of pole face 95 will coincide with the right hand edge of pole shoe 49; and the right hand edge of pole face 97 will coincide with the left hand edge of pole shoe 51. Substantially all the field flux will pass through armature 62; and substantially no field flux will flow through armature 63. Similarly if the gimbal is rotated 8° counterclockwise from the position shown, substantially all the field flux passes through armature 63 and substantially none through armature 62. Thus within a region of approximately ±8° from the null position, the output voltage will be substantially linear. This is a wide region in which linear outputs may be obtained. Assume that battery 100 supplies 28 volts D.C. Assume that input and output windings have the same number of turns per coil. Assume that at rated speed the back electromotive force generated in the input winding is 16 volts D.C. If the gimbal is rotated 8° clockwise or counterclockwise, then the voltage generated in the output winding will be ±16 volts D.C. This is a sensitivity of ±2 volts per degree of gimbal deflection. It will be appreciated that by providing two or three times as many turns in each output coil as there are in each input coil the sensitivity may be increased to ±4 or ±6 volts per degree of gimbal deflection. It will be noted that the field flux tends somewhat to rotate with the gimbal. Thus when the gimbal is rotated 8° clockwise from a null position, flux flows through armature 62 parallel to the laminations and is hence shifted from vertical in FIGURE 1.

The various features of my single degree of freedom gyroscope may be used concurrently, as shown, or may be used individually. For example, suppose it is desired to use a conventional external pick-off to detect rotation of the gimbal but that it is desired to use either eddy current damping in rate gyro applications or an integral torquing winding for integrating gyro applications. Only the input winding is now required; and the output winding may be eliminated along with the output commutator. The pair of subpoles 50 and 51 may be replaced by a single pole similar to pole shoe 49 centrally aligned along the south pole line S and diametrically opposed to pole shoe 49. Snap spring end rings 77 and 78 may be eliminated and additional armature laminations may be inserted between armatures 62 and 63 to form a single armature having no intermediate axial duct spacing. Winding 106 may now be a conventional winding extending between pole faces 94 and 95 as shown and returning between pole faces 96 and 97 in the space occupied by thermistor 111. It is important here that pole shoe 49 and its diametrically opposed pole shoe which replaces the pair of split pole shoes 50 and 51 subtend a circumferential length of arc in FIGURE 1 which is less than that subtended by pole faces 94 and 95 and also pole faces 96 and 97, respectively. As the gimbal rotates relative to pole shoe 49 and its diametrically opposed pole shoe, there will be no redistribution of the flux flowing through the pole shoes, rather there will be a redistribution of the flux linking the conductive areas of the float gimbal cylinder 98 and a change in the flux linking what is now the centrally located winding 106. The flux path now remains precisely vertical in FIGURE 1 and consequently passes through the armature at an angle proportional to the rotation of the gimbal from its null position. In rate gyro applications the now centrally threaded winding 106 may be again short-circuited through thermistor 111. The change in flux leakages in the conductive areas of float cylinder 98 and in winding 106 produces eddy currents which react upon pole shoe 49 and its diametrically opposed pole shoe in a manner to oppose motion of the gimbal. Here our only concern is mechanical damping since output voltages will be obtained from a conventional pick-off. Accordingly, if critical damping is desired then the actual mechanical damping must be increased to critical. In integrating position gyro applications currents flowing through what is now the centrally located winding 106 produce cross fields which react with the pole shoes to produce gimbal torques. When winding 106 is centrally wound, the magnetomotive force is entirely cross magnetizing relative to the main field flux with no differential effect on what will now be the two halves of the single armature.

It will be appreciated that in rate gyro applications the entire damping may be provided by the areas of conductive material of float cylinder 98 and winding 106 may be eliminated. Furthermore, in rate gyro applications the entire damping may be provided by short-circuiting winding 106 through thermistor 111 and forming float cylinder 98 of a nonconductive material having appreciable mechanical strength. Finally in position gyro applications, where winding 106 is used for torquing, float cylinder 98 may again be formed of some rigid but nonconductive material.

The total damping in rate gyro applications will be due at least partially either to the use of conductive areas for cylinder 98, or to the short-circuiting of winding 106, or to a combination of these effects. However, some of the damping will be occasioned by stray eddy current losses in paths having a positive temperature coefficient of resistance and by viscous friction in the gap between cylinder 98 and pole shoes 49 through 51, which viscous friction is temperature sensitive because of viscosity changes in the buoying fluid. Accordingly, it is necessary that there be at least some damping which becomes more effective with rise in temperature. If the float gimbal cylinder is formed of conductive material which does not have a negative coefficient of resistance, then winding 106 must have such negative temperature coefficient as may be accommodated either by the material of the winding or by the use of the thermistor 111. Similarly if the short-circuited winding 106 does not yield a resultant negative coefficient of resistivity, then the areas of conductive material of cylinder 98 must supply the negative temperature coefficient to compensate for the unavoidable positive temperature coefficient due to buoyant fluid viscosity in the gap adjacent the pole shoes 49 through 51 and to stray eddy current losses in paths having a positive temperature coefficient of resistance.

In the preferred embodiment of my invention, as shown, the field structure is stationary; and the armature is journalled in the gimbal. However, it will be appreciated by those skilled in the art that the parts may be reversed. This simply requires that the armature be stationary and the field structure be journalled in the gimbal. Such reversal of parts results in a construction similar to that used in alternators and synchronous motors which are known to the art.

It will be seen that I have accomplished the objects of my invention. My gyroscope provides an output proportional to gimbal deflection within wide limits. The output may be single-phase or polyphase alternating current or may be low-ripple direct-current with no need for external, synchronous, phase-sensitive demodulators. Double current outputs are readily obtained. The output power is obtained by direct conversion from the source of input excitation power, yielding a high efficiency gimbal pick-off. Weight and space are saved by eliminating pick-off magnetic structure. In position applications my integrating gyroscope needs no torquer magnetic structure, thereby contributing to additional savings in weight and space requirements. In velocity applications my rate gyroscope has linear damping and a constant damping factor by the use of eddy current effects in paths having a negative temperature coefficient of resistivity. My gyroscope has a low threshold and a high sensitivity and an infinite resolution; and the damping factor in rate applications may readily be adjusted to any desired value.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A single degree of freedom gyroscope including in combination a spin motor armature, a gimbal, means journalling the armature in the gimbal, spin motor salient field poles, and means mounting the gimbal for rotation relative to the salient field poles.

2. A single degree of freedom gyroscope including in combination a spin motor armature, a member, a gimbal, means journalling the armature in the gimbal, means journalling the gimbal in the member, and means mounted on the member for forcing spin motor field flux through the armature.

3. A single degree of freedom gyroscope including in combination a spin motor armature, spin motor field structure including salient poles, and means mounting the armature for rotation relative to the field structure about two orthogonal axes.

4. A single degree of freedom gyroscope including in combination an assembly comprising a spin motor armature and a gimbal, means journalling the armature in the gimbal, means for producing spin motor magnetic field flux, means mounting the gimbal for angular movement relative to the field flux means, and means mounted on the assembly for providing an electrically conductive path which links the field flux variably in response to said relative angular movement.

5. A single degree of freedom gyroscope including in combination an assembly comprising a spin motor armature and a gimbal, means journalling the armature in the gimbal, means for providing spin motor magnetic field flux, means mounting the gimbal for angular movement relative to the field flux means, a winding mounted on the assembly and linking the field flux variably in response to said relative angular movement.

6. A single degree of freedom gyroscope including in combination a spin motor armature, spin motor salient field poles, a gimbal, means including the gimbal for permitting rotation of the armature relative to the salient field poles about two orthogonal axes, and an area of electrically conductive material interposed between a salient field pole and the armature.

7. A single degree of freedom gyroscope including in combination a spin motor armature having an axis, a gimbal, means journalling the armature in the gimbal, a pair of axially spaced spin motor field poles of one magnetic polarity, a spin motor field pole of the opposite magnetic polarity, and means mounting the gimbal for rotation relative to said field poles.

8. A single degree of freedom gyroscope including in combination a pair of axially-spaced spin motor armatures, a gimbal, means mounting the pair of armatures for common rotation relative to the gimbal, spin motor salient field poles, and means mounting the gimbal for rotation relative to the salient field poles.

9. A single degree of freedom gyroscope having an input axis and an output axis and a spin reference axis and including in combination a spin motor armature, means providing spin motor field flux generally in the direction of the input axis, means mounting the armature for rotation relative to the field flux about both the output and spin reference axes, and means adapted to provide a cross-field flux in the armature having a component parallel to the spin reference axis.

10. A single degree of freedom gyroscope having an input axis and an output axis and a spin reference axis and including in combination a pair of spin motor armatures, means for providing spin motor field flux in the pair of armatures generally in the direction of the input axis, means mounting the pair of armatures for rotation relative to the field flux about both the output and spin reference axes, and means adapted to provide oppositely directed magneto-motive forces in the pair of armatures having components parallel to the input axis.

11. A single degree of freedom gyroscope having an input axis and an output axis and a spin reference axis and including in combination a pair of spin motor armatures, means for providing spin motor field flux generally in the direction of the input axis, means mounting the pair of armatures for rotation relative to the field flux about both the output and spin reference axes, and means adapted to provide oppositely directed cross-field fluxes in the pair of armatures having components parallel to the output axis.

12. A single degree of freedom gyroscope having an input axis and an output axis and a spin reference axis and including in combination a two-pole spin motor comprising an armature and field structure, the field structure providing flux generally in the direction of the input axis, and means mounting the armature for rotation relative to the field structure about both the output and spin reference axes.

13. A single degree of freedom gyroscope including in combination a spin motor armature, spin motor field poles, a gimbal, means including the gimbal for permitting rotation of the armature relative to the field poles about two orthogonal axes, and a transition pole formed of a permeable material and interposed between a field pole and the armature.

14. A single degree of freedom gyroscope including in combination a spin motor armature, spin motor field poles, a gimbal, means including the gimbal for permitting rotation of the armature relative to the field poles about two orthogonal axes, an area of electrically conductive material interposed between the armature and a fiield pole, and a transition pole formed of a permeable material and interposed between the conductive area and the armature.

15. A rate gyroscope including in combination a spin motor armature, means for providing spin motor field flux, a gimbal, means journalling the armature in the gimbal, means mounting the gimbal for angular movement relative to the field flux means, and means mounted on the gimbal for providing an electrically conductive path having a negative temperature coefficient of resistivity and having linkages with the field flux which vary responsive to said relative angular movement.

16. A single degree of freedom gyroscope including in combination a pair of spin motor armatures, spin motor field poles, a gimbal, means mounting the pair of armatures for common rotation relative to the gimbal, means mounting the gimbal for rotation relative to the field poles, and an armature winding linking the pair of armatures in series-bucking relation.

17. A single degree of freedom gyroscope including in combination a pair of spin motor armatures, spin motor field poles, a gimbal, means mounting the pair of armatures for rotation relative to the gimbal, means mounting the gimbal for rotation relative to the field poles, and a winding mounted on the gimbal and linking the pair of armatures in series-bucking relation.

18. A single degree of freedom gyroscope including in combination a pair of spin motor armatures having axes, a gimbal, means mounting the pair of armatures for common rotation relative to the gimbal, a pair of axially spaced spin motor field poles of one magnetic polarity, a spin motor field pole of the opposite magnetic polarity, and means mounting the gimbal for rotation relative to said field poles.

19. A single degree of freedom gyroscope including in combination a spin motor armature, a gimbal, means journalling the armature in the gimbal, a hollow cylindrical housing formed of a permanent magnetic material so magnetized as to create a longitudinally extending north pole and a diametrically opposed longitudinally extending south pole, and means journalling the gimbal in the housing.

20. A single degree of freedom gyroscope including in combination a fluid-tight housing, a float having at least a portion formed of an electrically conductive material, means journalling the float within the housing, a buoyant fluid occupying the volume enclosed between the float and the housing, a spin motor armature, means journalling the armature within the float, and means mounted within the housing for coupling magnetic flux to the armature through the electrically conductive portion of the float.

21. A single degree of freedom gyroscope including in combination a spin motor armature having a certain axial length, a spin motor salient field pole, a gimbal, means journalling the armature in the gimbal, and means mounting the gimbal for rotation relative to the salient field pole, the salient field pole having an axial length appreciably less than that of the armature but not substantially less than one-half that of the armature, the construction being such that the projected air-gap area between field pole and armature is a substantially constant value independent of limited gimbal rotation.

References Cited in the file of this patent

UNITED STATES PATENTS

| | | |
|---|---|---|
| 1,802,108 | Chessin | Apr. 21, 1931 |
| 2,378,858 | Mehan | June 19, 1945 |
| 2,581,965 | Miller | Jan. 8, 1952 |
| 2,898,765 | Atkinson et al. | Aug. 11, 1959 |

FOREIGN PATENTS

| | | |
|---|---|---|
| 122,639 | Australia | Apr. 3, 1947 |
| 1,138,533 | France | Jan. 28, 1957 |